Jan. 30, 1940.   O. SEVERSON   2,188,743

MILLING CUTTER

Filed April 7, 1939

INVENTOR
OLE SEVERSON
BY A. T. Sperry
ATTORNEY

Patented Jan. 30, 1940

2,188,743

UNITED STATES PATENT OFFICE 2,188,743

MILLING CUTTER

Ole Severson, Shelton, Conn., assignor to The Apex Tool & Cutter Company, Inc., a corporation of Connecticut Application April 7, 1939, Serial No. 266,573

3 Claims. (Cl. 29—105)

This invention relates to milling cutters for use in the conventional type of milling machine, the principles of the invention are, however, applicable to many various types of cutting tools which utilize inserted blades.

It is among the general objects of the invention to provide an improved cutter assembly which provides both ease of adjustment of the blades and at the same time an improved rigidity of the securement of the blades in the cutter body.

A more specific embodiment of the invention is to provide in a helical blade type of milling cutter, a positive positioning means between the blade and the cutter body, such means being readily adjustable in a step by step manner so as to facilitate accurate setting of the blades.

Another object is to provide in a helical bladed milling cutter, an interlock between the blade and the body by the use of cooperating serrations such that accidental displacement of the cutter in the block will be prevented.

Numerous other objects and advantages of the present invention will become apparent from a consideration of the following specification taken in connection with the accompanying drawing in which.

Figure 1:
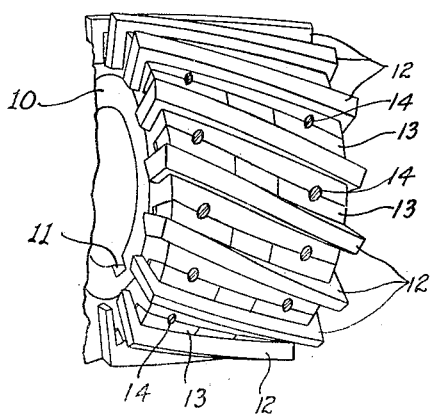
Figure 1 is a fragmentary view of one form of the present invention.
Figure 2:
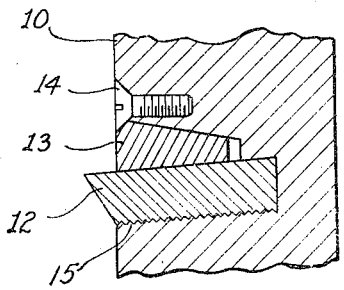
Figure 2 is a detail side elevation showing the blade and wedge securing means.
Figure 3:
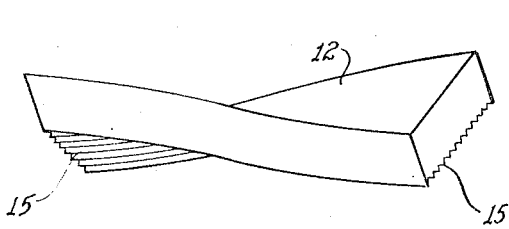
Figure 3 is a side elevation of the blade.
Figure 4:
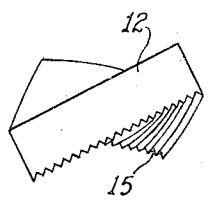
Figure 4 is an end elevation of the blade.

Referring more particularly to the drawing, the invention is shown as applied to a conventional type milling cutter having a body 10 with the usual central bore and keyway 11 to adapt it for mounting upon a conventional milling machine arbor.

The peripheral face of the body 10 is provided with helical slots adapted to receive the helical cutting teeth or blades 12 and the wedge pieces 13, the latter being secured in position by screws 14. The wedges 13 are also of helical formation and may be formed either to extend the entire length of the blade 12, or may be as shown, one or more short helical wedge segments. As will be later pointed out, the serrated interlocking of blades and body permit the use of wedge segments without loss of the required rigidity between blade and body.

The blade is formed in a helix of preferable alight pitch and of uniform cross section both longitudinally and transversely. The face 15 of the blade which lies against the wall of the body slot, is formed with longitudinally extending serrations which, in conformity with the blade itself, are helical. The cooperating face of the body slot is also formed with similar longitudinally extending serrations so that when in position, the helical serrations interlock to positively lock the blade against accidental movement in the body.

In a consideration of the present invention, it will be seen that since the serrations of the blade follow the helix of the blade and since the serrations of the body slot similarly follow the helix of the slot, the interrelation of the serrations gives a thread-like interfitting and when the wedge is applied to force the serrations together, they mate in the same manner as threads of a nut and bolt. The present invention, therefore, provides an assembly in which the serrations play a part beyond that usually found in plane serrated tool blades which do not have the helical formation.

Numerous changes, modifications and the full use of equivalents may be resorted to in the practice of the invention without departing from the spirit or scope of the appended claims.

I claim:

1. In a cutter assembly, the combination with a cutter body having a helically formed blade receiving aperture one wall of which is serrated, of a longitudinally slidable helically formed cutter receivable therein and having serrations on one face thereof adapted to engage the serrations of said wall.

2. In a cutter assembly, the combination with a cutter body having a longitudinally slidable helically formed blade receiving aperture one wall of which is serrated, of a helically formed cutter receivable therein and having serrations on one face thereof adapted to engage the serrations of said wall and wedge means engageable with the opposite side of said blade to secure the blade in position.

3. In a milling cutter, a cylindrical body having helically formed blade receiving slots formed across the periphery thereof, one wall of each slot having helically formed serrations formed thereon, a longitudinally slidable cutter blade of helical formation having one face provided with helically formed serrations, and means for securing said blade within said slot with the serrations of each interlocking.

OLE SEVERSON.